(12) United States Patent
Honig

(10) Patent No.: US 6,539,405 B1
(45) Date of Patent: Mar. 25, 2003

(54) INFORMATION CROSS REFERENCING SYSTEM

(76) Inventor: Herbert M. Honig, 127 Lake St., Englewood, NJ (US) 07631

( * ) Notice: Subject to any disclaimer, the term of this patent is extended or adjusted under 35 U.S.C. 154(b) by 0 days.

(21) Appl. No.: 09/978,047

(22) Filed: Oct. 17, 2001

(51) Int. Cl.[7] .............................................. G06F 17/21
(52) U.S. Cl. .................................... 707/501.1; 707/530
(58) Field of Search .............................. 707/500, 513, 707/501.1, 514, 530

(56) References Cited

U.S. PATENT DOCUMENTS

| | | | |
|---|---|---|---|
| 4,109,938 A | | 8/1978 | Mitchell et al. |
| 4,503,515 A | | 3/1985 | Cuan et al. |
| 4,648,067 A | | 3/1987 | Repass et al. |
| 4,648,071 A | | 3/1987 | Repass et al. |
| 4,696,491 A | | 9/1987 | Stenger |
| 4,832,374 A | | 5/1989 | Prest, Jr. |
| 4,949,999 A | | 8/1990 | Ke-Hui |
| 4,978,143 A | | 12/1990 | Ericson |
| 5,097,418 A | | 3/1992 | Nurse et al. |
| 5,111,397 A | | 5/1992 | Chirokas et al. |
| 5,623,681 A | * | 4/1997 | Rivette et al. .............. 707/522 |
| 5,897,143 A | | 4/1999 | Baaqeil |
| 5,953,732 A | * | 9/1999 | Meske, Jr. et al. .......... 707/513 |
| 5,963,205 A | * | 10/1999 | Sotomayor .................. 707/531 |
| 6,154,757 A | * | 11/2000 | Krause et al. .............. 707/530 |
| 6,275,301 B1 | | 8/2001 | Bobrow et al. |
| 6,295,542 B1 | * | 9/2001 | Corbin ..................... 707/501.1 |

FOREIGN PATENT DOCUMENTS

| | | |
|---|---|---|
| EP | 94514 | 11/1983 |
| EP | 94516 | 11/1983 |
| JP | 3-188525 | 8/1991 |

OTHER PUBLICATIONS

Insight, Version 5.1, Enigma Corp., 1998, screen printouts 1–7 and helpfile printouts pp. 1–98.*
Strassler, Robert B. (ed.), "Thucydides, A Comprehensive Guide to the Peleponnesian War," Copyright 1996 by Robert B. Strassler, Published by the Free Press (Simon & Shuster), Introduction and Footnote on p. IX.

* cited by examiner

Primary Examiner—Stephen S. Hong
(74) Attorney, Agent, or Firm—Richard C. Litman

(57) ABSTRACT

An information cross referencing system facilitates the finding of various bits of information in a reference manual, textbook, computer tutorial, or other reference or educational work. The present system is self-referential, operating throughout a text, program tutorial, or other work as required. The present cross referencing system also works both forward and backward through the text or work, to indicate procedures or steps later in the work from a given point and also to refer back to earlier explanations from later points in the work. The present system comprises an alphanumeric code of up to three characters to indicate the chapter, section, and specific step within a section. A mnemonic code is used to indicate specific illustrations by chapter and illustration number, and further to indicate a specific step shown in the illustration. A further mnemonic code is used to indicate shortcut steps where suitable.

14 Claims, 3 Drawing Sheets

INFORMATION CROSS REFERENCING SYSTEM

BACKGROUND OF THE INVENTION

1. Field of the Invention

The present invention relates generally to informational documents, whether hard copy or computerized, and more specifically to a system of cross referencing information contained in such a document for ease of reference. The present invention provides a self-referential reference system which can work forward and backward through the material, and that is adaptable for use in virtually any type of informational document. The present system is particularly valuable in instructional manuals for teaching the use of various types of computer programs, such as word processing programs, etc.

2. Description of the Related Art

The process of learning a new skill, the use of a new article of equipment, computer program, etc., can be one of the more difficult tasks faced by a person in everyday life. Fortunately, there are generally a number of instructional materials available for learning most new skills and for dealing with most forms of equipment, computer programs, etc. However, such instructional materials are often difficult to use and difficult to access specific information from, in their own right.

One of the primary reasons such manuals can be difficult to use is the fact that in most cases where instruction in a new skill is involved, a relatively large number of steps is required to accomplish some given task. Many times these steps must be accomplished in close succession, or perhaps even simultaneously for a few of the steps. Also, in many cases the procedure for accomplishing different tasks requires many of the same steps, and/or same order, as that required for accomplishing other related tasks, with the differences amounting to relatively small variations in a few of the steps, and/or their order of accomplishment.

Typically, most instructional works describe the steps involved in a given process only once, with the student then being required to work back and forth through the instructional work to find those steps required for related processes, even if the student knows the basic process for which each of the steps is described in detail. This results in the person learning the skill, being required to review back and forth in the instructional material in an attempt to find each of the perhaps many steps involved in a given process. It is of course impossible for the new user of the equipment or program to learn all of the steps of a given procedure at one time, and hence it becomes necessary to work back and forth through the instructional work, either turning to the appropriate pages in a hard copy manual or reviewing a number of menus in a computer program, in order to find the single piece of information required for the next step in a procedure.

Accordingly, a need will be seen for an information cross referencing system, which enables a user of the system to quickly and easily find specific sections or instructions in a relatively complex and lengthy reference or instructional work. The present system responds to this need by providing an easily learned system for cross referencing various areas of text, reference figures, shortcut steps, and/or other aspects of a hard copy or computerized reference source or instructional work. The present system is self-referential, in that a work incorporating the present system uses the system in text and other references throughout, to refer to other areas of the work which are related to the specific function cross referenced by the system. Thus, a process involving a step A, but which also involves steps B and C, will refer to steps B and C and their location in the reference work in the discussion of step A, with the discussion of steps B and C likewise referring back to step A and to one another, in order to simplify the search for the required information to carry out the process.

As will be understood from the preceding discussion, the present system also works both forward and backward through the reference work or text, depending upon the relative locations of the various steps involved. The present system is particularly valuable in indicating a specific option in a computer menu, with its generally wide number of options.

A discussion of the related art of which the present inventor is aware, and its differences and distinctions from the present invention, is provided below.

U.S. Pat. No. 4,109,938 issued on Aug. 29, 1978 to James A. H. Mitchell et al., titled "System For Arranging And Retrieving Information," describes a redundant system including text, illustrations, diagrams, and marginal cross referencing notes to refer to different, but related, articles. The Mitchell et al. system is adapted for use in encyclopedia type publications and references, where a series of not necessarily related articles is arranged in alphabetical order. The Mitchell et al. system differs further from the present system in that the text, illustrations, diagrams, etc. are somewhat redundant, with a person seeking information about a given subject being able to review either the primary text, an ancillary text, a primary illustration, all of the illustrations, or some combination thereof, to gain the desired information. In contrast, the present system provides a series of mnemonic alphanumeric reference codes in order to enable a user of the work incorporating the system, to easily refer back and forth to related steps and procedures.

U.S. Pat. No. 4,503,515 issued on Mar. 5, 1985 to Victor Cuan et al., titled "Footnote Assembly Management," describes a computer program for editing and formatting text and associated footnotes. The Cuan et al. system is not self-referential, as it does not refer back and forth throughout the entire document as can the present system. As the Cuan et al. system is directed only to assembly of footnotes in a document, it thus involves only a forwardly directed reference system (from text to following footnote), and does not refer back, as can the present system.

U.S. Pat. Nos. 4,648,067 and 4,648,071, both issued on Mar. 3, 1987 to James T. Repass et al., respectively titled "Footnote Management For Display And Printing" and "Designation Of Footnotes And Footnote Reference," both describe additional systems for installing footnotes with associated text at the time of document assembly or printing. The Repass et al. footnote assembly systems are more closely related to the system of the Cuan et al. '515 U.S. Patent, discussed immediately above, than to the present cross referencing system. As footnotes only follow closely adjacent text, there is no disclosure of any form of forward cross referencing or mnemonic code for locating related information in other areas of the work, as is provided by the present system.

U.S. Pat. No. 4,696,491 issued on Sep. 29, 1987 to Barbara J. Stenger, titled "Information Reference Book And Indexing System," describes a recipe reference book, in which two types of preprinted abstract pages are provided. The user must enter data relating to specific magazine articles, books, page numbers, etc. for any recipes desired.

The Stenger system enables the user to quickly look up the specific cookbook, magazine, etc. where a specific recipe may be located. However, the Stenger book essentially serves as an index for other works, rather than serving as an instructional work per se, as it does not contain the actual recipes, but rather serves as a reference guide for locating those recipes in other books and works. Stenger makes no suggestion regarding any forward and backward cross referencing in her book, as there is no motivation for such a system in her book per se.

U.S. Pat. No. 4,832,374 issued on May 23, 1989 to Kenneth W. Prest Jr., titled "System For Indexing Textual Material," describes an indexing system incorporating a series of dividers, each having an outwardly extending tab. The tabs are marked with an alphanumeric indicator to indicate the subject matter (different legal codes or regulations, etc.) following that particular tab and divider. The Prest, Jr. system is thus not a self-referential cross reference system, as is the present system, but rather merely a different means of separating different subject matter in a single work or volume.

U.S. Pat. No. 4,949,999 issued on Aug. 21, 1990 to Cui Ke-hui, titled "Book Indexing System," describes an alphabetic system adapted to alphabetically arranged works, such as dictionaries and encyclopedias. The Ke-hui system comprises printing a series of alphabetically ordered letters along the exterior edges of the pages of the work, with each letter subtending a width equal to the thickness of the pages having subject matter beginning with that letter. Other smaller letters are used to represent the succeeding letters in words in a given alphabetic section of the work, with color codes also being used. While dictionaries, encyclopedias, and instructional manuals are all reference works, the Ke-Hui system cannot be adapted to the typical instructional manual, as such instructional manuals are arranged in order of procedures, rather than in alphabetical order. Moreover, the Ke-hui system is not a self-referencing cross reference system, as is the present invention.

U.S. Pat. No. 4,978,143 issued on Dec. 18, 1990 to Thomas H. Ericson, titled "Book Indexing System," describes such a system for works in which the various sections are arranged by name, rather than in any particular alphabetic or numerical order, e. g., the Bible. The Ericson system provides a series of numbered tabs which are installed at the beginning of each section (or Biblical book), and an index showing the correspondence of the book or section names with the numbers of the index tabs. The Ericson system is not a self-referential work, in that the book itself does not refer back and forth to other sections or parts thereof, as does a work incorporating the present referencing system.

U.S. Pat. No. 5,097,418 issued on Mar. 17, 1992 to Howard L. Nurse et al., titled "Method And Means For Managing Citations In Documents," describes another system for formatting and assembling footnotes in a document. The Nurse et al. system cannot provide a self-referential cross referencing system, as does the present invention. The Nurse et al. system is more closely related to the systems discussed further above in the Cuan et al. '515 and Repass et al. '067 and '071 U.S. Patents, than to the present system.

U.S. Pat. No. 5,111,397 issued on May 5, 1992 to David S. Chirokas et al., titled "Managing Lengthy Footnotes In A Work (sic) Processing Document," describes yet another system for formatting and assembling footnotes in a document. The Chirokas et al. system is more closely related to the systems of the Cuan et al. '515, Repass et al. '067 and '071, and Nurse et al. '418 U.S. Patents, than to the present system.

U.S. Pat. No. 5,897,143 issued on Apr. 27, 1999 to Hassan Baaqeil, titled "Method Of Indexing A Book," describes an alphabetic system for dictionaries and the like. Baaqeil indexes a series of major pages, and then indexes each page thereunder with headings along the upper margin. Each succeeding page is taller than the one preceding, in order for all indexed upper edges to be seen simultaneously in a given section. The Baaqeil system does nothing to cross reference the internal subject matter, nor does it provide any mnemonic means to assist the user in determining the type of information being referenced, as does the present system.

European Patent Publication No. 94,514 published on Nov. 23, 1983 to International Business Machines, titled "Designation Of Footnotes And Footnote References," describes a system closely related to that described in the '071 U.S. Patent to Repass et al., discussed further above. The '514 European Patent Publication is based upon the same parent application as the '071 U.S. Patent and was invented by the same inventors, with the assignee in the '071 U.S. Patent being International Business Machines. The points made in the discussion of the '071 U.S. Patent are thus felt to apply here as well.

European Patent Publication No. 94,516 published on Apr. 7, 1990 to International Business Machines, titled "Footnote Formatting," describes another system invented by Repass et al. and closely related to the '067 and '071 U.S. Patents and '514 European Patents discussed above. The same points raised in those discussions, are felt to apply here as well.

Japanese Patent Publication No. 3-188,525 published on Aug. 16, 1991 to Tatsua Morishima describes (according to the English abstract) a computer system in which further operational information, instructions, etc. are called up on the screen by means of a "help" key on the keyboard. The computer selects the appropriate information from information stored therein and according to the specific error or operation being conducted by the computer user. The '525 Japanese Patent Publication does not appear to disclose any cross referencing of different but related information in a hard copy manual or book, or any corresponding cross referencing system in a computer program or system, as provided by the present system.

Finally, "Thucydides, A Comprehensive Guide To The Peleponnesian War," edited by Robert B. Strassler and published by The Free Press of Simon and Schuster (copyright 1996 by Robert B. Strassler), includes a cross referencing system described in a footnote on page ix of the introduction. The introduction includes a plurality of groups of three numbers, with each number in a given group referring to the book, chapter, and section number in the body of the work. However, no mnemonic system is used to refer to illustrations, and the system is not self-referential, in that the body of the work (i. e., the Thucydides translation itself) does not include any references referring to other portions thereof, nor does the body of the work refer back to any points in the introduction. In contrast, the present system is self-referential, with references working both forward and backward in the work.

None of the above inventions and patents, taken either singularly or in combination, is seen to describe the instant invention as claimed. Thus an information cross referencing system solving the aforementioned problems is desired.

SUMMARY OF THE INVENTION

The present invention is a system for cross referencing informational works, such as hard copy instructional texts and manuals, computer tutorials, etc. The present system provides a means of referencing related matter both forward and backward through the text, manual or other program, by using an easily recognized and understood series of alphanumeric characters to refer to appropriate areas or passages of the work. The system also includes mnemonics, to indicate to the user that areas other than text (e. g., drawing figures or references, shortcut tips, etc.) are referenced.

The present system basically uses a series of two numbers and a letter to cross reference a chapter, section, and specific step in the text, with the mnemonic designation "F" used to refer to a drawing figure. The figure designations are further defined by a chapter number and figure number, with a second number following the figure number to indicate a specific step shown in the figure. Additional mnemonic references beginning with the letter "S," indicate shortcut steps which may be used, with additional codes provided to indicate specific keystrokes to be used in accomplishing certain steps when using a computer program.

Accordingly, it is a principal object of the invention to provide an information cross referencing system for use with instructional manuals, textbooks, computer tutorials, and other reference and instructional works.

It is another object of the invention to provide such a system which is self-referential and forward and backward referential, for referencing areas and points throughout the body of the work in both preceding and successive areas of the work.

It is a further object of the invention to provide an information cross referencing system incorporating easily used alphanumeric codes indicating chapter, section, and specific step in the text or body of a work, as well as mnemonic codes for indicating illustration figures by chapter, figure, and specific step illustrated within the figure, and shortcut codes or steps.

Still another object of the invention is to provide such a system including codes indicating specific keystrokes for accomplishing a given step or procedure in a computer program.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention comprises various embodiments of a system or method for cross referencing information in a body of work, such as an instructional manual, textbook, computer tutorial, etc. While the present cross referencing system is particularly well adapted for use in the teaching of the operation of various computer programs, it will be seen that it is also well adapted to many other fields as well, in virtually any type of non-fiction work. Moreover, it may be adapted for use in other works as well, in cross referencing various areas, chapters, sections, etc. of the work to one another, or even to another work, as desired.

Figure 1:
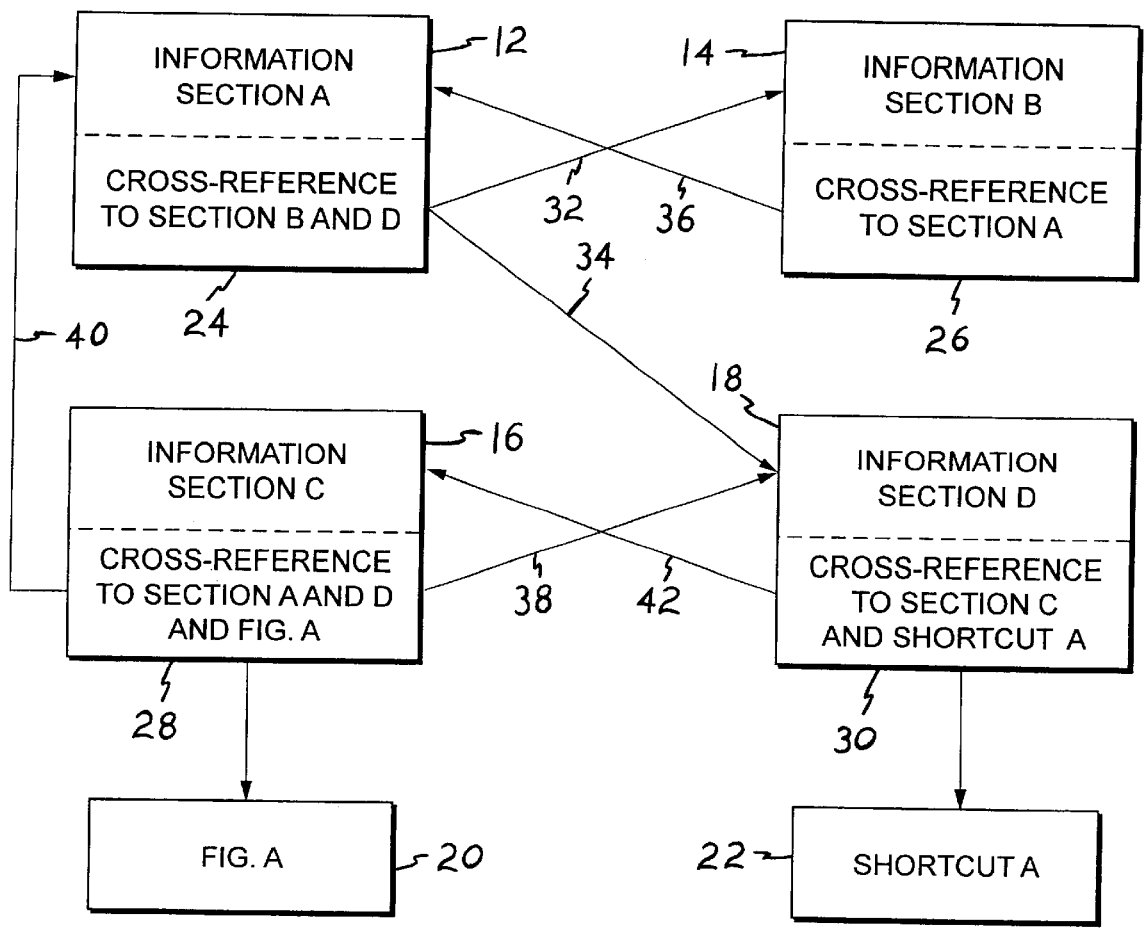
FIG. 1 is a block diagram illustrating the self-referential, forward and rearward operation of the information cross referencing system of the present invention.

FIG. 1 provides a block diagram of the general operation of the present system. FIG. 1 represents a reference work 10 having a series of information sections A, B, C, and D, respectively indicated by reference numerals 12, 14, 16, and 18 therein, as well as a reference illustration or FIG. 20 and a shortcut step 22. The information sections 12 through 18 may comprise chapters and/or other major and/or minor divisions in the reference work 10, e. g., one or more of the chapters may be broken up into smaller sub-chapter portions, as is known in the reference work field. Each of the sections 12 through 18 may include one or more reference illustrations, such as the exemplary FIG. A illustration 20 represented in FIG. 1 of the drawings. Of course, additional illustrations are likely to be provided in a reference work, with the single FIG. A illustration 20 shown in FIG. 1 of the drawings, being exemplary. In the same manner, a series of shortcut steps may be provided in the work, with the single shortcut A step 22 being exemplary in the work 10 represented in FIG. 1.

The present system provides methods of referring back and forth through the reference work 10, to facilitate the finding of various materials therein. FIG. 1 of the drawings illustrates this by including a series of cross references, respectively 24, 26, 28, and 30, within each of the sections 12 through 18 in FIG. 1. These cross references 24 through 30 are arranged as required to enable a user of the reference work 10 to quickly and easily refer either backward or forward through the work 10, to find critical explanations or information as required.

At least some of the minor sections of the work 10 may include one or more specific instructional steps therein, instructing the user of the work in the specific accomplishment of some operation. While major sections (e. g., chapters) are generally numbered, as are minor sections which break up the chapters, such specific instructional steps are generally referenced by the letters of the alphabet, although they may be numbered instead. Table I below provides an exemplary listing of such major sections or chapters, minor sections, and instructional steps.

TABLE I

MAJOR AND MINOR SECTIONS AND INSTRUCTIONAL STEPS

| CHAPTER/<br>MAJOR SECTION | SUBCHAPTER/<br>MINOR SECTION | INSTRUCTIONAL<br>STEP |
| --- | --- | --- |
| 1 | 1 | a |
| 2 | 2 | b |
| 3 | 3 | c |
| 4 | 4 | d |
| 5 | 5 | e |
| etc. | etc. | etc. |

Each cross reference code group is placed within brackets, in order to indicate clearly that it is a cross reference. The two numbers of the chapter and subchapter are separated by a decimal point, in order to avoid any confusion or indication that the two numbers may comprise a single, two or greater digit number. Thus, a cross reference to a specific instruction d in minor section or subchapter 3 of chapter 5, would be designated [5.3d]. A cross reference to a specific instruction x in subchapter 12 of chapter 15, would be designated as [15.12x].

FIG. 1 of the drawings illustrates such cross referencing by means of a series of arrows extending from each of the cross references, either backward or forward to one or more of the information sections A through D. For example, information section A contains a cross reference 24 to information contained in section B, and also in section D, as indicated by the forwardly extending cross reference arrows 32 and 34. Section B contains a cross reference 26 referring back to section A, as indicated by the rearwardly extending cross reference arrow 36. Information section C contains a cross reference 28 which refers forward to information in section D, as indicated by the cross reference arrow 38, and also backward to information in section A, as indicated by the cross reference arrow 40. Finally, information section D contains a cross reference 30 which refers back to information section C, as indicated by the cross reference arrow 42. It will be seen that other cross reference routes and combinations may be formed in the same manner, depending upon the requirements of the work 10.

Reference works generally also contain a series of reference illustrations or figures, as exemplified by the FIG. A block 20 of FIG. 1. The present system is also usable in referring to such illustrations, and to specific instructional steps in those figures. Most such illustrations are referenced by the number of the chapter in which they are placed, and further by their sequential order in the chapter. The present system references illustrations by using the mnemonic letter "F" (for "Figure"), followed by the chapter number and figure number in that chapter.

Each reference code group is placed in brackets, just as in the case of text cross references described further above. The chapter number and figure number within the chapter, are separated by a dash to avoid confusion with a two (or more) digit number. Thus, a figure or illustration cross reference e. g. in chapter 1, but referring to an illustration figure number 6 in chapter 3 of a reference work, would be indicated as [F6-3]. A figure cross reference in chapter 4, referring back to the third illustration in chapter 2, would be designated as [F2-3].

The present system is extremely valuable in reference works describing systems where it is necessary to perform identical, or quite similar, procedures at different times or for different purposes. An excellent example is in the operation of many computer programs, where it is often necessary to work through a series of menus which are common for many procedures, in order to arrive at the specific instruction desired in a single menu or submenu. The present system enables the user to quickly and easily refer back to the basic instruction for an operation, by means of the cross reference placed at the subsequent section where a related operation is described.

It will be seen that the overlay of multiple menus and submenus common in computer programs, can result in a rather tedious and cumbersome series of steps required to access some particular step or operation, depending upon the number of menus and submenus required to reach the menu containing the desired step or operation. The present system greatly simplifies the description and teaching of this process, by means of the cross reference codes for text and illustration figures described further above. However, the present system provides further simplification, by means of one or more shortcut steps which may be used to avoid need for accessing a series of menu instructions.

Many computer programs utilize mnemonic letters to indicate keyboard commands for performing various functions. As an example, most computer programs utilize the letter "P" as a print command. However, there are many other options generally available, e. g., spell checking a document after completion, display of the document prior to printing, selection of number of copies, etc. Thus, a single menu is unlikely to include all of the possible mnemonic or other commands for such work, with the instructions broken up into a series of menus and submenus. This requires the user to work through the series of menus and submenus until finally reaching the desired menu, with the desired instruction.

The present system may include a series of shortcut steps, e.g., the exemplary step 22 of FIG. 1. These shortcut steps each include the mnemonic letter "S" (for shortcut), with a number following. The user need only reference a list of shortcut instructions to find the specific shortcut designated by the corresponding number, in order to determine the specific keystroke commands and/or instructions required to perform the desired operation. One or more areas of the reference work 10 may refer to one or more shortcuts, as in the example of the information section D and its cross reference to section C and to shortcut A in FIG. 1.

Figure 2:
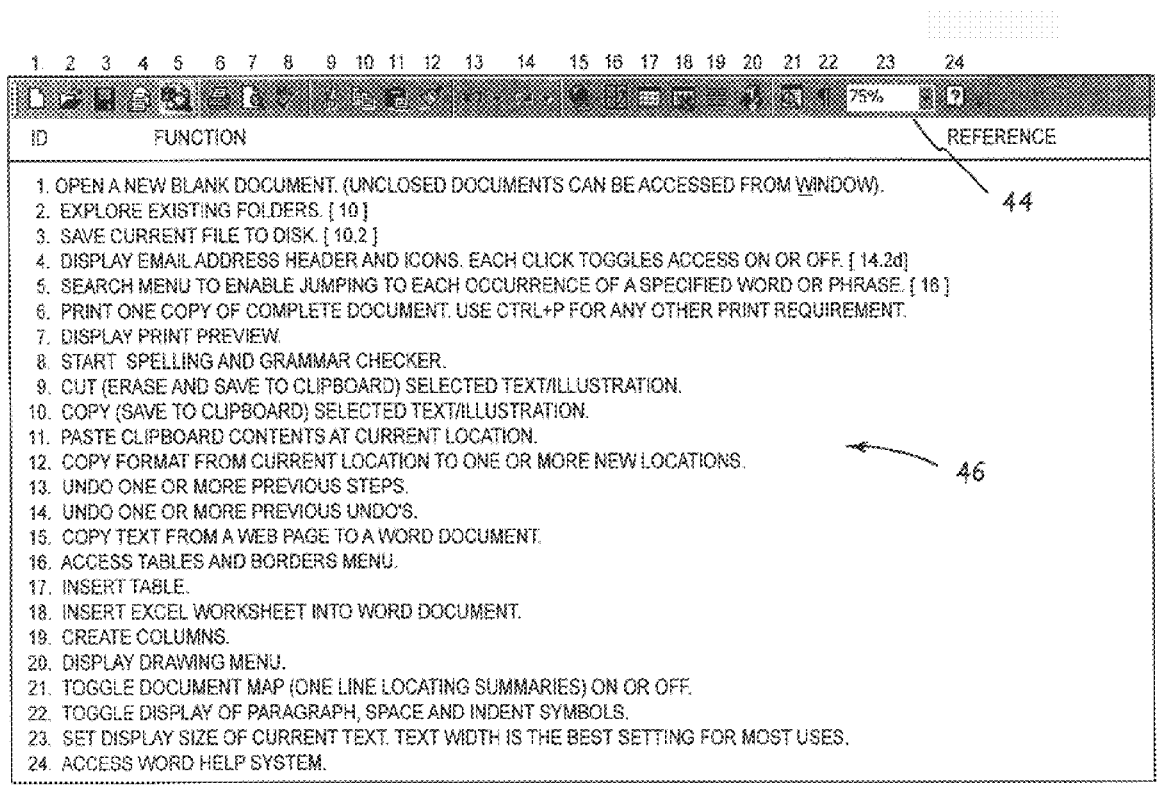
FIG. 2 is a representation of a "toolbar" or series of computer icons on a computer screen, and a corresponding text listing of their functions.

FIG. 2 of the drawings is a representation of a "toolbar," or series of graphic icons representing various computer operations. The "toolbar" 44 of FIG. 2 represents a series of relatively basic commands and instructions which may be used with Microsoft Word 2002XP. However, it will be understood that the use of a display from this program is merely exemplary, and the present cross referencing system is adaptable to references for other computer programs and other systems as well.

The icons of the toolbar 44 are sometimes difficult for the computer user to understand, as the functions represented by these pictorial symbols may not be intuitively obvious to the computer user. Accordingly, each of the symbols is numbered consecutively from one through twenty four, with a corresponding listing of their functions provided in a text list 46, with each operation of the list 46 being headed by a number corresponding to the number of the icon of the toolbar 44. The various operations of the text list 46 may include a further cross reference, enabling the user to turn to that particular referenced area to learn more about a particular operation. For example, instruction four, "Display Email Address Header And Icons. Each Click Toggles Access On Or Off. [14.2d]" provides a cross reference to chapter 14, section 2, and instructional step d, enabling the user to quickly and easily turn to that point in the reference work to refer to any additional information needed. The present system uses the above described cross reference codes for text, figures, shortcuts, etc. throughout the work to provide a completely self-referential reference work.

Figure 3:
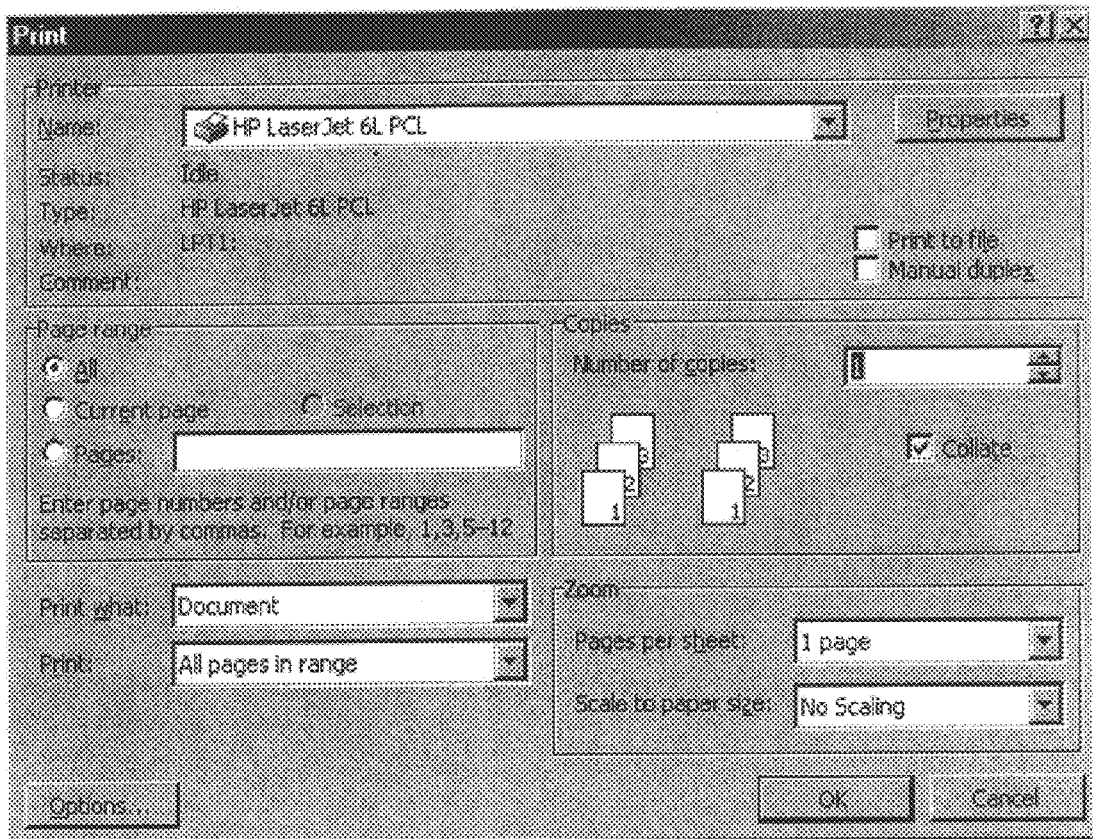
FIG. 3 is a representation of a menu on a computer screen and instructions for its use in accordance with the present system.

As has been noted further above, while the present cross referencing system is adaptable to a wide range of different types of hard copy manuals and other publications, it is particularly well adapted for use with computer tutorials, either in hard copy manuals which reference corresponding computer programs and steps in the operation thereof, or in electronic, computerized form for use with the corresponding computer program. FIG. 3 of the drawings illustrates one menu screen 48 for the exemplary Microsoft Word 2002XP program cited as an application of the present system throughout the present disclosure. This menu screen 48 representation includes the title 50 "Ref. 15-2. Print Menu [F P] or [S85]". Rather than referring to the screen representation of FIG. 3 as a "FIG.", the term "Ref." has been used to avoid confusion with FIG. 3 of the drawings in the present disclosure. Ordinarily, the term "FIG." would be used for the illustration figures contained within a reference work utilizing the present cross reference system, with the mnemonic letter "F" referring to cross references containing figure illustrations.

The title 50 of the screen representation of FIG. 3 includes the code [F P], as noted above. This code provides a shorthand instruction for the user to access the files (as indicated by the underlined mnemonic letter "F"), with the second mnemonic letter "P" representing the print instruction or command. While such mnemonic letters are used as commands within computer programs, the present system makes use of the mnemonics to guide the user externally from the program itself, in a reference work or tutorial.

The above described system allows the user of the program or reference work, to proceed directly to the specific submenu and/or instruction or command desired, rather than requiring the user to proceed sequentially through a series of menus and submenus. This system of providing the appropriate commands with each illustrated menu screen, enables the user of the present system to greatly simplify operations and greatly reduce the number of keystrokes otherwise required to complete a given instruction by sequentially proceeding through a number of layers of menus and submenus.

In conclusion, the present cross referencing system provides a novel means for a person using a reference work (book, manual, computer tutorial, etc.) to quickly and easily access specific critical information within the work, rather than having to work back (or forward) generally through the work in an attempt to find the critical information. The present system is particularly suitable for use in situations where procedures or operations are at least somewhat repetitive, permitting the user to quickly and easily find the basic procedure for subsequent operations which are related to an initial operation. The present system is adaptable to text, graphic illustrations or figures, and multiple layers of computer menus and submenus, thus providing an essentially universal system which will find favor among users of virtually any type of technical or reference work.

It is to be understood that the present invention is not limited to the embodiments described above, but encompasses any and all embodiments within the scope of the following claims.

I claim:

1. A method for cross referencing material in a reference work having a plurality of portions therein, comprising the following steps:

(a) providing a reference work including a plurality of major sections, a plurality of minor sections within at least two of the major sections, and a plurality of instructional steps within at least two of the minor sections;

(b) further providing a first series of sequential numbers for referencing each of the major sections, with each of the numbers of the first series corresponding to one of the major sections in sequential order;

(c) further providing a second series of sequential numbers for referencing each of the minor sections, with each of the numbers of the second series corresponding to one of the minor sections in sequential order;

(d) further providing a series of sequential letters for referencing each of the instructional steps, with each of the letters of the instructional steps corresponding to one of the instructional steps in sequential order;

(e) indicating a specific major section, minor section, and instructional step from a first portion of the reference work in a second portion of the reference work, by placing one of the first series of numbers, one of the second series of numbers, and one of the series of letters referring to the major section, minor section, and instructional step of the first portion of the reference work, in the second portion of the reference work, thereby providing backward cross referencing in the reference work; and (f) indicating a specific major section, minor section, and instructional step from the second portion of the reference work in the first portion of the reference work, by placing one of the first series of numbers, one of the second series of numbers, and one of the series of letters referring to the major section, minor section, and instructional step of the second portion of the reference work, in the first portion of the reference work, thereby, providing both forward and backward cross referencing in the reference work.

2. The method for cross referencing material in a reference work according to the method of claim 1, further including the step of continuing in the above manner as required for cross referencing the first portion, second portion, and other portions of the reference work to one another and forming a self-referential work.

3. The method for cross referencing material in a reference work according to the method of claim 1, further including the steps of:

(a) providing at least one reference figure within at least one of the major sections of the reference work;

(b) further providing a mnemonic letter for indicating reference to a reference figure;

(c) sequentially numbering each of the reference figures within each of the major sections; and (d) indicating a specific reference figure within a specific major section from a first portion of the reference work in a second portion of the reference work, by placing the mnemonic letter, one of the first series of sequential numbers, and one of the sequential numbers within the corresponding major section and corresponding to the specific reference figure, in the second portion of the reference work.

4. The method for cross referencing material in a reference work according to the method of claim 1, further including the steps of:

(a) providing a series of shortcut procedures for performing corresponding procedures defined in the reference work;

(b) further providing a mnemonic letter for indicating reference to the shortcut procedures;

(c) further providing a series of sequential shortcut numbers for referencing each of the shortcut procedures, with each of the shortcut numbers of the series corresponding to one of the shortcut procedures in sequential order; and (d) placing a mnemonic shortcut indicator letter and appropriate one of the sequential shortcut numbers at the applicable portion of the reference work, and indicating that a shortcut procedure is provided for accomplishing the procedure described.

5. The method for cross referencing material in a reference work according to the method of claim 1, further including the step of forming the reference work as a hard copy reference manual.

6. The method for cross referencing material in a reference work according to the method of claim 1, further including the step of forming the reference work as a computer tutorial program.

7. The method for cross referencing material in a reference work according to the method of claim 6, further including the steps of:
   (a) providing a series of computer program menus and submenus, and a mnemonic letter corresponding to each of the menus and submenus;
   (b) further providing a list of text descriptions of the operations permitted according to the menus and submenus; and
   (c) further providing an indicator adjacent at least one of the menus, for indicating one of the mnemonic letters for accessing a corresponding one of the submenus from the at least one of the menus.

8. A method for cross referencing material in a reference work having a plurality of portions therein and forming a self-referential work, comprising the following steps:
   (a) providing a reference work including a plurality of major sections, a plurality of minor sections within at least two of the major sections, and a plurality of instructional steps within at least two of the minor sections;
   (b) further providing a first series of sequential numbers for referencing each of the major sections, with each of the numbers of the first series corresponding to one of the major sections in sequential order;
   (c) further providing a second series of sequential numbers for referencing each of the minor sections, with each of the numbers of the second series corresponding to one of the minor sections in sequential order;
   (d) further providing a series of sequential letters for referencing each of the instructional steps, with each of the letters of the instructional steps corresponding to one of the instructional steps in sequential order;
   (e) indicating a specific major section, minor section, and instructional step from a first portion of the reference work in a second portion of the reference work, by placing one of the first series of numbers, one of the second series of numbers, and one of the series of letters referring to the major section, minor section, and instructional step of the first portion of the reference work, in the second portion of the reference work, thereby providing backward cross referencing in the reference work; and
   (f) continuing in the above manner as required for cross referencing the first portion, second portion, and other portions of the reference work to one another and forming a self-referential work.

9. The method for cross referencing material in a reference work according to the method of claim 8, further including the steps of:
   (a) positioning the second portion of the reference work following the first portion of the reference work; and
   (b) indicating a specific major section, minor section, and instructional step from the second portion of the reference work in the first portion of the reference work, by placing one of the first series of numbers, one of the second series of numbers, and one of the series of letters referring to the major section, minor section, and instructional step of the second portion of the reference work, in the first portion of the reference work, thereby providing both forward and backward cross referencing in the reference work.

10. The method for cross referencing material in a reference work according to the method of claim 8, further including the steps of:
    (a) providing at least one reference figure within at least one of the major sections of the reference work;
    (b) further providing a mnemonic letter for indicating reference to a reference figure;
    (c) sequentially numbering each of the reference figures within each of the major sections; and
    (d) indicating a specific reference figure within a specific major section from a first portion of the reference work in a second portion of the reference work, by placing the mnemonic letter, one of the first series of sequential numbers, and one of the sequential numbers within the corresponding major section and corresponding to the specific reference figure, in the second portion of the reference work.

11. The method for cross referencing material in a reference work according to the method of claim 8, further including the steps of:
    (a) providing a series of shortcut procedures for performing corresponding procedures defined in the reference work;
    (b) further providing a mnemonic letter for indicating reference to the shortcut procedures;
    (c) further providing a series of sequential shortcut numbers for referencing each of the shortcut procedures, with each of the shortcut numbers of the series corresponding to one of the shortcut procedures in sequential order; and
    (d) placing a mnemonic shortcut indicator letter and appropriate one of the sequential shortcut numbers at the applicable portion of the reference work, and indicating that a shortcut procedure is provided for accomplishing the procedure described.

12. The method for cross referencing material in a reference work according to the method of claim 8, further including the step of forming the reference work as a hard copy reference manual.

13. The method for cross referencing material in a reference work according to the method of claim 8, further including the step of forming the reference work as a computer tutorial program.

14. The method for cross referencing material in a reference work according to the method of claim 13, further including the steps of:
    (a) providing a series of computer program menus and submenus, and a mnemonic letter corresponding to each of the menus and submenus;
    (b) further providing a list of text descriptions of the operations permitted according to the menus and submenus; and
    (c) further providing an indicator adjacent at least one of the menus, for indicating one of the mnemonic letters for accessing a corresponding one of the submenus from the at least one of the menus.

* * * * *